RE 25712

SUPERCONDUCTIVE SWITCHING ELEMENT

Filed July 2, 1957

*INVENTOR.*
ALBERT E. SLADE
*BY*
Blair & Spencer
ATTORNEYS.

United States Patent Office 2,946,030

Patented July 19, 1960

2,946,030

SUPERCONDUCTIVE SWITCHING ELEMENT

Albert E. Slade, Cochituate, Mass., assignor to Arthur D. Little, Inc., Cambridge, Mass.

Filed July 2, 1957, Ser. No. 669,669

17 Claims. (Cl. 336—155)

This invention relates to a superconductive switching element whose inductance may be shifted from one discrete level to another in response to an electrical control signal. More particularly, it relates to a coil having a superconductive core which, because of its magnetic flux-exclusion characteristic, maintains the inductance of the coil at a low level; the core is rendered resistive by a magnetic field, thus losing its flux-exclusion properties, and the inductance of the coil is thereby materially increased. The invention also concerns a switching circuit and a transformer incorporating such an element.

Figure 1:
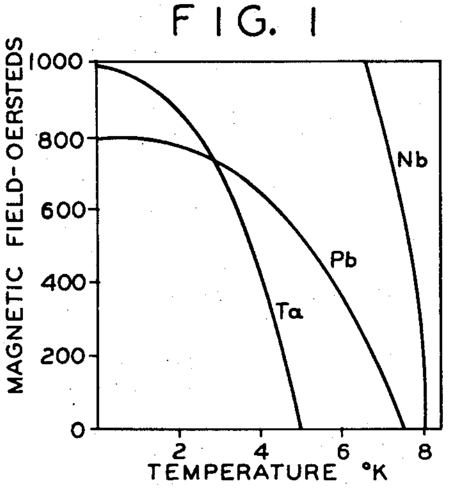
Figure 2:
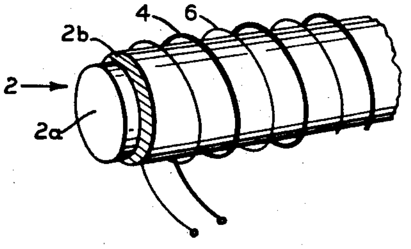
Figure 3:
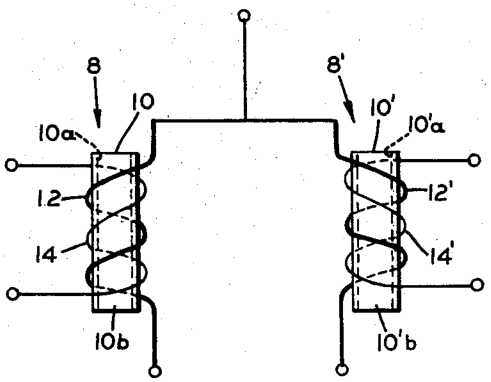
Figure 4:
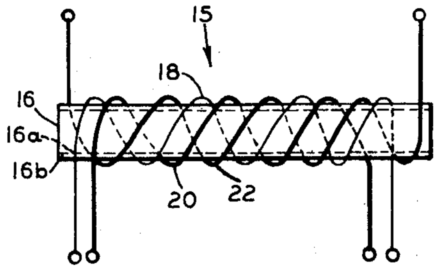

The construction and operation of my invention may best be understood from the following description taken with the accompanying drawings in which:

Figure 1 is a family of curves for different materials showing how the temperatures at which a material becomes superconductive change as a function of applied magnetic field, the materials being superconductive when maintained under the conditions represented by the areas to the left of and below the respective curves, Figure 2 is a fragmentary pictorial representation of a switching element made according to my invention, Figure 3 is a schematic representation of a switch utilizing a switching element made according to my invention, and Figure 4 is a schematic representation of a transformer utilizing a switching element made according to my invention.

My switching element depends for its operation on the changes in properties of certain electrical conductors when subjected to temperatures approaching absolute zero. As the temperature approaches absolute zero, in the absence of an applied magnetic field these materials change suddenly from a resistive to a superconductive state in which their resistance is identically zero. The temperature at which this sudden change occurs is known as the transition temperature. When a magnetic field is applied to the conductor, its transition temperature is lowered, the relationship between the applied magnetic field and transition temperature for a number of these materials being shown in Figure 1.

As shown in this figure, in the absence of a magnetic field tantalum loses all electrical resistance when reduced to a temperature of 4.4° K. or below, lead does so at 7.2° K., and niobium at 8° K. In all, there are twenty-one elements in addition to many alloys and compounds which undergo transition to the superconductive state at temperatures ranging between 0 and 17° K.

The presence of a magnetic field causes the transition temperature to move to a lower value, or, if a constant temperature is maintained, a magnetic field of sufficient intensity will cause the superconductive material to revert to its normal resistive state. From Figure 1 it is apparent that a magnetic field of between 50 to 100 oersteds will cause a tantalum object held at 4.2° K. (the boiling point of liquid helium at atmospheric pressure) to change from a superconductive to a resistive state.

Heretofore a switching element called the cryotron has been developed which directly utilizes the transition characteristics of normally superconductive (i.e. superconductive at the temperature of operation in the absence of an applied magnetic field) materials. This element usually includes a normally superconductive gate conductor made, for example, of tantalum, about which is wound a control coil, the control coil being made of niobium, for example. The control coil is connected to a power supply capable of passing sufficient current through the coil to develop a magnetic field which "quenches" the gate conductor, i.e. renders it resistive.

Thus the cryotron gate switches between states of resistivity and infinite conductivity depending upon whether the control conductor is or is not carrying more than a certain amount of current. Two of these elements may be connected in appropriate circuitry to a common current source. If the gate of one is in the superconductive state and the gate of the other the resistive, all the current will flow through the former gate and none through the latter. The current path may be switched through the latter gate by de-energizing its control coil to make the gate superconductive and energizing the control coil around the other gate to render that gate resistive. Various circuits such as flip-flops, etc., have been devised incorporating cryotrons for use in data processing and like equipment.

Normally, when tantalum gate conductors are used, the cryotrons are operated in a liquid helium bath at atmospheric pressure to obtain a practical quenching field level, i.e. in the neighborhood of 50 to 100 oersteds.

In certain applications it may be desirable to have a switching element which switches an alternating current signal but does not affect the path of direct-current flow. It may also be desirable for such an element to operate at depressed temperatures and in conjunction with cryotrons and other superconductive elements.

It is a principal object of my invention to provide an alternating-current switching element utilizing the superconductive properties of certain materials at depressed temperatures. It is a more specific object of my invention to provide a switching element of the above character capable of transition between two inductance levels and adapted for use with cryotrons and other superconductive circuit elements. It is a further object of the invention to provide a switching element of the above character capable of wide variation in inductance. It is yet another object of my invention to provide a switching element of the above character capable of high switching speed. A still further object of my invention is to provide a novel switching circuit incorporating switching elements of the above character. Another object of my invention is to provide a transformer utilizing a switching element of the above character. A final stated object of my invention is to provide a switching element of the above character which is of simple and low-cost construction. Other objects will in part be obvious and will in part appear hereinafter.

The invention accordingly comprises the features of construction, the combinations of elements, and arrangements of parts which will be exemplified in the constructions hereinafter set forth, and the scope of the invention will be indicated in the claims.

My switching element utilizes the transition characteristics of superconductive materials to shift the inductance of an inductor from one discrete level to another. The inductor has an inductance coil wound about a normally superconductive core. A second winding, which may be called a control winding, is similarly wound around the core and connected to a source of control current. If sufficient current is passed through the control coil to quench the superconductive core of the switching element, the inductance of the inductance coil will rapidly and materially increase. When the current in the control coil is diminished below the quenching level, the core once again becomes superconductive and the inductance decreases to its prior level.

The inductance of a coil is determined by the amount of magnetic flux developed by current through the coil, and this is dependent upon the cross sectional or core area of the coil through which the flux may pass, and the permeability of the core. The operation of my switching element depends upon the fact that superconductive materials are impermeable to magnetic flux. Although the reasons for this are not fully known, it may be because, when magnetic fields are imposed on superconductive materials, eddy currents are set up in them which give rise to secondary fields of equal intensity and opposite direction to those of the imposed fields. Thus the net field through the material is zero and no flux can pass through it. This phenomenon has been observed in solid objects of superconductive material and also in the space bounded by toroids and cylindrical shells of such material. While this is one of several possible theories, my invention does not depend upon the reason for this phenomenon, but merely on the fact that it exists. Therefore, when a superconductor forms a large portion of the core of my switching element, the effective cross-sectional area of the inductance coil, i.e. the area through which flux can pass, is small, and the inductance of the inductance winding is accordingly extremely small. When the superconductive core is quenched, the effective cross-sectional area of the coil corresponds to its actual cross-sectional area and therefore the inductance is materially increased.

In Figure 2, I have illustrated an inductor utilizing the principles of my invention, the inductor comprising a core 2 about which are wound an inductance coil 4 whose inductance is to be controlled and a control coil 6. The core 2 is preferably in the form of a central portion 2*a* of ferro-magnetic material covered by a thin shell 2*b* of a superconductive material. With shell 2*b* in the superconductive state, coil 4 has minimum inductance because, as pointed out above, the area within the coil through which magnetic flux can pass is extremely small, being limited essentially to the space taken up by the insulation between the coil and the shell. If sufficient current is then passed through coil 6 to quench the entire superconductive shell, the magnetic flux can pass through the entire cross section of the coil 4, and since this is almost entirely occupied by the highly permeable central portion 2*a*, the inductance of the coil will be increased greatly.

The inner portion 2*a* of the core 2, in addition to being highly permeable, should have a sufficiently high saturation level to avoid saturation from the currents in the control and inductance windings. The superconductive shell 2*b* should require for quenching a field sufficiently high that the shell will not be quenched by currents which ordinarily flow in inductance winding 4. A suitable material for the shell is tantalum or lead, depending upon the strength of the field developed by the current in the inductance winding. If maximum difference between the two values of inductance is desired, the shell should be as thin as possible. Thinness of the shell is advantageous also from the standpoint of increasing the resistance of the shell when in its non-superconductive state, thereby minimizing losses attributable to eddy currents flowing in the shell. Thus it may be suitably formed around the central portion by conventional evaporation or electro-deposition processes. The coil 4 is preferably superconductive to eliminate resistance losses in the circuit. It may be formed from 3-mil niobium wire having a critical quenching field sufficiently greater than that of the shell 2*b* to prevent quenching of the inductance winding by the current in the control winding 6. The niobium wire should have insulation of minimum thickness. A ¼-mil coating of sintered polytetrafluoroethylene is suitable for this purpose.

The control winding 6 may be formed from ordinary copper wire if there is no restriction on the power available from the control-current source. However, it may be of the same material as the coil 4 so as to be superconductive and eliminate the generation of heat in the liquid-helium bath in which the switching element is operated. Moreover, when superconductive, it may readily be supplied from cryotrons or other superconductive elements in the circuitry allied with it. The winding 6 should be of sufficient length and have sufficient turns to permit quenching of the entire length of the shell 2*b* about which the inductance winding 4 is wound.

The length of the shell 2*b* should somewhat exceed that of the coil 4 to prevent magnetic flux from linking any turns of the coil when the shell is superconductive. For greater efficiency, the central portion 2*a* may be in the form of a ring or any other closed magnetic path; when it is so formed, the inductance of the coil when the shell is quenched is maximized. On the other hand, where space is a primary factor, it is preferable to have the central portion in the form of a bar as shown in Figure 2. A typical inductor made according to my invention may be 0.25 inch long with a core diameter of 9 mils and an overall diameter of approximately 16 mils. This small space requirement permits an installation utilizing many thousands of these inductors to be packaged in a space less than one cubic foot. The switching element is preferably immersed in a liquid-helium bath to obtain the low temperatures required for superconductivity. As seen in Figure 1, if the superconductive materials described are utilized, the liquid-helium bath may be at atmospheric pressure, and the coil 4 and control coil 6 will be superconductive, while the core coating 2*a* will readily change from the superconductive to the resistive state.

Figure 3 illustrates a two-position switch using a pair of my novel inductive switching elements. These elements, generally indicated at 8 and 8', are similar to the element illustrated in Figure 2, having cores 10 and 10', respectively, inductance windings 12 and 12', respectively, and control windings 14 and 14', respectively, all similar to their counterparts in Figure 2. The cores may thus have ferro-magnetic inner portions 10*a* and 10'*a* carried by normally superconductive shells 10*b* and 10'*b*, respectively. The inductance windings are shown joined together at one end for connection to an alternating-current source (not shown) to be switched. The other ends of the inductance windings are to be connected to the circuit elements (not shown) to be supplied from the switch. The impedance of these other circuit elements should be such that, when it is desired to switch the current source through inductor 8 or 8', the total impedance through that branch will be much less than that through the other branch.

In typical operation, the control winding 14 may be energized to quench the superconductive material in the core 10 and increase the inductance of winding 12. Coil 14' is unenergized, and the superconductive material in core 10' maintains the inductance of winding 12' at its lower level. Thus with inductor 8 having an inductance much higher than that of inductor 8', much the greater portion of the current will pass through inductor 8' (assuming that the circuits supplied by the switch are resistive or inductive and assuming that the impedance of such circuits is low relative to that of inductor 8' in its high inductance state). If it is desired to switch the current to pass through inductor 8, control coil 14' is energized and coil 14 de-energized. The branch that passes through inductor 8 now has the lesser impedance, and most of the current will flow through it.

Figure 4 illustrates a transformer, generally indicated at 15, utilizing a switching element made according to my invention. As shown therein, the transformer may have a core 16, similar to the core 2 of Figure 2, with a ferro-magnetic inner portion 16*a* covered by a normally superconductive shell 16*b*. A control winding 18, similar to control winding 6 of Figure 2, is also provided, as are primary and secondary inductance windings 20 and 22, respectively, similar to inductance coil 4 of Figure 2. With no current passing through the control winding 18, the superconductive material in the core 16 reduces the net flux through the core linking the secondary winding 22. Therefore the output at the terminals of the secondary winding 22 is at a minimum. However, if the control coil 18 is energized with a current sufficient to quench the superconductive material in the core, the primary winding 20 may develop a substantial magnetic flux which also links secondary winding 22, and the output of the transformer is accordingly markedly increased. Although I have shown the core 16 as a rod or bar, it will be understood that it may have any suitable transformer core configuration and that the primary and secondary coils may be interwound as shown or they may be on different portions of the core.

Thus I have described a superconductive switching element for alternating currents which performs its switching function by shifting from one discrete inductance level to another under the influence of an electric current. The inductor has a normally superconductive core which, when it is in the superconductive state, prevents the passage of appreciable flux through an inductance coil, thereby maintaining the inductance of this coil at a minimum value. Under the influence of the magnetic field developed by a control coil also wound around the core, the superconductive material may be quenched so that the core may pass magnetic flux. The amount of flux, depends upon the magnetic nature of the core when in the quenched state, and determines the inductance of the coil in that state. The switching speed is extremely fast because a material may shift between the quenched and superconductive states in an extremely short time. As described above, my switching element may be used to switch a source of alternating current to any one of several circuits paths and may also be used to control the output of a transformer.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A switch comprising, in combination, a plurality of switching elements, each of said switching elements including a core having a central portion and a shell portion formed thereabout, said shell being capable of superconductivity in the absence of a magnetic field and adapted to transfer to a resistive state upon the application of such a field thereto, an inductance winding wound about said shell portion, and means other than said inductance winding for rendering said shell portion resistive, one end of each of said inductance windings being connected to one end of every other inductance winding of said switch to form the input terminal of said switch.

2. The combination defined in claim 1 in which at least one of said switching elements includes a control coil wound about the shell portion thereof, whereby current through said coil may develop a magnetic field of intensity sufficient to quench said shell.

3. A transformer comprising, in combination, a core having a central portion and a shell portion, said shell portion being superconductive at the temperature of operation of said transformer in the absence of an applied magnetic field and adapted to transfer to a resistive state upon the application of such a field thereto, a primary winding, a secondary winding, and means adapted to apply such a field to said shell portion to render it resistive, to thereby increase the flux developed by said primary winding which links said secondary winding.

4. The combination defined in claim 3 in which said means comprises a control winding wound about said shell, whereby current through said control winding may develop a magnetic field to render said shell resistive.

5. A switching element comprising, in combination, a core including a portion which is superconductive at the temperature of operation of said element in the absence of an applied magnetic field and adapted to transfer to a resistive state upon the application of such a field thereto, said superconductive portion being disposed around an inner ferromagnetic portion, an inductance coil wound about said core, said coil being superconductive at the temperature of operation of said element in the absence of an applied magnetic field and being characterized by a critical quenching field higher than that of said superconductive portion of said core, and means for applying a magnetic field to said core to at least partially quench said superconductive portion thereof, thereby to increase the inductance of said coil.

6. The combination defined in claim 5 wherein said means comprises a control coil wound about said core, whereby current through said control coil may develop a magnetic field of sufficient intensity to render said superconductive portion of said core resistive.

7. The combination defined in claim 5 in which said coil is of niobium.

8. A switching element comprising, in combination, a conductor, means for varying the inductance of said conductor, said means comprising a ferromagnetic core with a shell formed thereabout, said shell being superconductive at the temperature of operation of said element in the absence of an applied magnetic field and adapted to transfer to a resistive state upon application of the magnetic field thereto, means other than said conductor for applying to said shell a magnetic field of sufficient intensity to render it resistive and thereby increase the permeability of said inductance varying means, said inductance varying means being disposed in close proximity to said conductor, whereby changes in the conductive state of said shell effected by said field applying means vary the magnetic flux developed by current in said conductor, thereby to vary its inductance.

9. The combination defined in claim 8 in which said conductor is of a material which is superconductive at the temperature of operation of said element and which requires a stronger magnetic field to render it resistive at such temperature than does said superconductive shell of said inductance varying means.

10. The combination defined in claim 8 in which said field applying means is a second conductor in close proximity to said superconductive shell, whereby current through said second conductor may develop a magnetic field of sufficient intensity to render at least part of said shell resistive.

11. A switching element comprising, in combination, a core, an inductance winding around said core, said core having a ferromagnetic central portion with a ring formed thereabout, said ring being of material which is superconductive at the temperature of operation of said element in the absence of an applied magnetic field and capable of transfer to a resistive state upon application of a magnetic field thereto, and control means other than said inductance winding for rendering said ring resistive, thereby to increase the inductance of said inductance winding.

12. The combination defined in claim 11 in which said control means is a second coil wound about said core.

13. The combination defined in claim 12 in which said superconductive ring extends the length of said ferromagnetic central portion.

14. A switching element comprising, in combination, an inductance conductor, a control conductor, an object comprising material which is superconductive at the temperature of operation of said element in the absence of an applied magnetic field and adapted to transfer to a resistive state upon the application of such a field thereto, said material being disposed about an inner ferromagnetic portion, said object being disposed in close proximity to said conductors, whereby said object provides a diamagnetic obstacle in the magnetic field of said inductance conductor when said material is in the superconductive state and has substantially less reluctance when in the resistive state, whereby the magnetic field developed by current in said control conductor may determine the conductive state of said superconductive material, thereby to control the inductance of said inductance conductor.

15. A switch comprising, in combination, a plurality of switching elements, each of which includes an inductance conductor, a control conductor and an object containing material which is superconductive at the temperature of operation of said switch in the absence of an applied magnetic field and adapted to transfer to a resistive state upon the application of such a field thereto, said object being disposed in close proximity to said inductance conductor and said control conductor, whereby current through said control conductor in each element may give rise to a magnetic field rendering resistive at least part of the superconductive material in said object in close proximity thereto, thereby increasing the inductance of the inductance conductor in close proximity to said object, one end of each of said inductance conductors being connected to one end of every other inductance conductor of said switch to form the input terminal thereof.

16. The combination defined in claim 15 in which said objects comprise ferromagnetic cores surrounded by superconductive material.

17. The combination defined in claim 15 in which each of said inductance conductors is of material which is superconductive at temperature of operation of said switch in the absence of an applied magnetic field and has a quenching field which is greater than that required to render resistive said superconductive material of said object in close proximity thereto.

References Cited in the file of this patent

UNITED STATES PATENTS 2,666,884 Ericsson et al. ---------- Jan. 19, 1954

OTHER REFERENCES

Publication, "Proceedings of the I.R.E.," vol. 44, issue 4, April, 1956.